United States Patent [19]
Russell et al.

[11] Patent Number: 6,090,354
[45] Date of Patent: *Jul. 18, 2000

[54] PROCESS FOR THE PRODUCTION OF TITANIUM OXIDE

[75] Inventors: John Henry Russell, Northallerton; David Ian Rochester, Stockton on Tees; Kenneth Burns, Leyburn; Roger Philip Bacon, Darlington, all of United Kingdom

[73] Assignee: Tioxide Group Services Limited, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/822,753

[22] Filed: Mar. 24, 1997

[30] Foreign Application Priority Data

Apr. 13, 1996 [GB] United Kingdom .................. 9607743

[51] Int. Cl.⁷ .................. C01G 23/02; C01G 23/047
[52] U.S. Cl. .................................. 423/82; 423/616
[58] Field of Search ...................... 423/616, 82

[56] References Cited

U.S. PATENT DOCUMENTS 2,344,288  3/1944  Dahlstrom .
3,877,929  4/1975  Whitehead et al. ................ 423/82
4,089,675  5/1978  Preston et al. ..................... 423/82
4,762,552  8/1988  Baldwin et al. .................... 423/82

FOREIGN PATENT DOCUMENTS 377396   11/1938  Canada .
898529   4/1972   Canada .
1026691  4/1966   United Kingdom .
1225826  3/1971   United Kingdom .
1282504  7/1972   United Kingdom .
1282508  7/1972   United Kingdom .
1312765  4/1973   United Kingdom .

*Primary Examiner*—Steven Bos
*Attorney, Agent, or Firm*—Baker Botts, L.L.P.

[57] ABSTRACT

A process for production of titanium oxide comprises digesting an ilmenite ore in which at least 92% by weight of the iron which is present is in the ferrous form, if necessary adding a reducing agent and subsequently precipitating hydrous titanium oxide. When a reducing agent is added the amount used is equivalent to less than 4.0% by weight metallic iron calculated with respect to ilmenite ore. The process enables an increased throughput on a pigment plant and less co-product in the form of iron compounds is produced.

19 Claims, No Drawings

PROCESS FOR THE PRODUCTION OF TITANIUM OXIDE

FIELD OF THE INVENTION

The invention relates to a process for producing titanium oxide and, in particular, a process in which the titanium oxide is precipitated from a titanium sulphate solution prepared by digestion of an ilmenite ore.

BACKGROUND OF THE INVENTION

A very important mineral from which titanium compounds and especially titanium dioxide for use as a pigment are extracted is ilmenite which has the theoretical formula $FeO.TiO_2$. However, naturally occurring ilmenite ores contain ferric iron in addition to ferrous iron.

Consequently, a conventional process for the extraction of titanium oxide from an ilmenite ore comprises digestion of the ore with sulphuric acid to form a titanium sulphate solution which also contains iron sulphates followed by reduction of this solution to ensure that all the iron present is in the ferrous state. Generally, a proportion of the titanium is reduced to the trivalent state during this step. The reduction is necessary to ensure that a minimum amount of hydrous iron oxide is precipitated when the sulphate solution is hydrolysed to form hydrous titanium oxide and a conventional method for carrying out the reduction is to add scrap metallic iron. Disadvantageously, the addition of scrap iron leads to an increased quantity of ferrous sulphate which must necessarily be processed or disposed of in an environmetally acceptable manner.

SUMMARY OF THE INVENTION

An object of the process of the invention is to provide a more economical and more environmentally acceptable process for producing titanium oxide.

According to the invention, a process for the production of titanium oxide comprises digesting an ilmenite ore with sulphuric acid to form a solution of titanium sulphate, if necessary adding a reducing agent to the titanium sulphate solution, and subsequently precipitating hydrous titanium oxide from the titanium sulphate solution, in which process said ilmenite ore has a composition such that at least 92 percent by weight of the iron present in the ore is in the ferrous state and, when added, the reducing agent is added in an amount equivalent to less than 4.0 percent metallic iron by weight calculated with respect to said ilmenite ore.

DESCRIPTION OF THE INVENTION

Generally available naturally-occurring ilmenite ores usually contain 45 to 65 percent by weight titanium calculated as $TiO_2$, 5 to 35 percent by weight ferric iron calculated as $Fe_2O_3$ and 5 to 40 percent by weight ferrous iron calculated as FeO. For titanium oxide production, ilmenite containing 55 to 65 percent $TiO_2$ is preferred and such feedstock generally contains 20 to 30 percent ferric iron calculated as $Fe_2O_3$. In the process of the invention, the ilmenite ore used contains at least 92 percent by weight of the iron in the ferrous state. The process of the invention is more economical than conventional processes partly because less or no reducing agent is used in treating the titanium sulphate. Consequently, an important feature is the use of an ilmenite which contains as high a proportion as possible of the iron in the ferrous state and it is preferred that at least 95 percent by weight of the iron in the ore is in the ferrous state. More preferably, at least 97 percent by weight of the iron present is in the ferrous state.

Normally, therefore, it is necessary to reduce a naturally-occurring ore before the ore is digested according to the process of the invention. This reduction can be carried out by any suitable process. Typically the ore is heated under reducing conditions in a fluid bed reactor, a rotary kiln or a multi-hearth furnace. The reducing atmosphere present during heating of the ore is typically produced by partial combustion of natural gas to form a mixture containing hydrogen, carbon monoxide, carbon dioxide and steam, and the combustion also effectively heats the ore. A source of carbon such as powdered coal or oil may be added to the ore to provide a heat source and a reducing atmosphere by partial combustion when the ore and carbon source are heated. When such a source of carbon is used it is important to ensure that only a minimal amount of carbon remains in the reduced ore in order to avoid dangerous reactions when sulphuric acid is added.

Generally, the ore is reduced at a temperature in the range 700° C. to 900° C. and usually at a temperature below 800° C.

The composition of the ore before reduction will largely determine the conditions under which the reduction is carried out but preferably the conditions are adjusted to ensure a maximum reduction of ferric iron to ferrous iron with minimum production of metallic iron by further reduction. Generally, this can be achieved by appropriate adjustment of the reducing gas atmosphere and the temperature to which the ore is heated.

If desired, the natural ilmenite ore may be oxidised as a first step in the process. When an oxidising step is used the natural ore is usually heated in the presence of a gas containing oxygen to a temperature in the range 600° C. to 1000° C. until substantially all the iron present is converted to the ferric valency state. The oxidised ore is then reduced by a process substantially as described hereinbefore until at least 92 percent and preferably at least 95 percent by weight of the iron present is in the ferrous state. The ease of digestion of an ore is improved when the ore has been subjected to a process of oxidation followed by reduction.

After reduction, the ore is generally milled to reduce its particle size and aid digestion with sulphuric acid.

The ilmenite ore is digested by mixing the ore with sulphuric acid and heating until an exothermic reaction commences, usually at a temperature in the range 95° C. to 120° C. Generally, a gas is passed through the digestion mixture to provide a pneumatic mixing process. The acid used preferably has a concentration in the range 80 to 94 percent $H_2SO_4$ by weight and the ratio of acid to ore is preferably between 1.4:1 and 2.0:1 by weight. The temperature of the digestion mixture is raised as a result of the exothermic reaction and generally reaches a value in the range 180° C. to 220° C. The product of reaction is a porous digestion cake which is subsequently dissolved by the addition of water or dilute sulphuric acid containing up to about 25 percent by weight $H_2SO_4$ to produce a titanium sulphate solution.

The preparation of a titanium sulphate solution by digestion of the ilmenite ore may be a batchwise or a continuous process.

The process according to the invention is characterised by the fact that this titanium sulphate solution requires less reduction to convert ferric ions to ferrous ions than similar conventional processes. A convenient method for carrying out reduction is to add a quantity of scrap iron. According to the process of this invention less than 4.0 percent by weight scrap iron is added calculated with respect to weight of_ ilmenite ore digested. Preferably, less than 2.0 percent scrap iron by weight is used with respect to ilmenite ore. Most preferably no reduction step is carried out, although, frequently, some oxidation occurs during digestion and therefore the addition of some reducing agent is necessary.

The invention has been characterised by reference to scrap iron as a reducing agent but the use of other reducing agents is within the scope of the invention. Alternative reducing agents which can be used include metallic zinc, aluminium, sulphurous acid and sodium thiosulphate. An electrolytic reduction process can also be used. When one of these alternative processes is used, the amount of reduction to which the titanium sulphate solution is subjected is equivalent to the use of less than 4.0 percent by weight scrap iron based on weight of ilmenite ore.

It is important to ensure that there is minimum oxidation of ferrous ions to ferric ions during subsequent steps and, when a reduction step is used, it is normal to ensure that a small amount of trivalent titanium is formed in the solution. The amount produced is preferably up to about 4 percent by weight of the titanium present.

Generally, it is necessary to clarify the titanium sulphate solution and the clarification step can be carried out either before or after the reduction step (when present). Usually a flocculating agent such as a poly(meth) acrylic acid or its salt, casein or glue is added and the flocculated solids are allowed to settle before the clarified solution is separated.

Commonly, some ferrous sulphate is removed from the clarified solution before hydrous titanium oxide is precipitated. The removal of ferrous sulphate is particularly important when the 'Blumenfeld' method of precipitation in which titanium oxide formation is induced by the addition of water is employed. Preferably, when the 'Blumenfeld' process is used the ratio of iron to titanium in the titanium sulphate is adjusted to less than 0.3:1 expressed as $Fe:TiO_2$ by weight. The process of the invention generally results in a lower iron to titanium ratio than conventional processes because of the minimum amount of reduction of the titanium sulphate solution which is needed. Consequently a low iron to titanium ratio is easier to achieve.

The crystallisation of ferrous sulphate is frequently achieved by cooling the titanium sulphate solution with or without evaporation of water to a temperature in the range 5° C. to 35° C. and preferably to a temperature in the range 5° C. to 15° C. The cooling can be achieved, for example, by applying a vacuum or with cooling coils. The ferrous sulphate which crystallises is removed by any suitable process such as decantation, filtration or centrifuging.

After clarification and removal, if desired, of ferrous sulphate, the titanium sulphate solution is converted to hydrous titanium oxide. The concentration of the solution and the ratio of acid to titanium may be adjusted before precipitation of the hydrous titanium oxide. Generally, before precipitation the titanium sulphate has an acid to titanium ratio expressed as $H_2SO_4:TiO_2$, in the range 1.7:1 to 2.5:1 by weight. Preferably, the acid to titanium ratio is in the range 1.8:1 to 2.0:1 $H_2SO_4:TiO_2$ by weight. Usually, the concentration of titanium sulphate present is equivalent to between 100 and 250 g $TiO_2$ per liter.

The titanium sulphate solution is converted to hydrous titanium oxide by any suitable technique. A typical technique is known as the 'Blumenfeld' process in which the solution is heated to a temperature usually in the range 80° C. to 100° C. and water is added. An alternative, commonly used, technique is known as the 'Mecklenburg' process in which the titanium sulphate solution is heated to a temperature frequently in the range 80° C. to 110° C. and a previously-prepared slurry of titanium oxide nuclei is added to induce precipitation.

After precipitation, the hydrous titanium dioxide is separated and treated by conventional processes. Pigmentary titanium dioxide is produced by leaching and washing filter cake followed by calcination to develop pigmentary particles usually in the presence of calciner additives which control the formation of pigmentary crystals. After calcination a surface coating of, for example an inorganic oxide and/or an organic compound may be deposited on the particles thereof. Titanium dioxide which is suitable for use in non-pigmentary applications can be produced by drying the washed filter cake.

In some processes the ferrous sulphate is separated from the solution using the above described processes after the titanium oxide has been precipitated and separated. The residual acidic solution is either recycled for use as sulphuric acid by conventional means or neutralised before discharge, for example as gypsum.

The process of the invention is advantageous because it produces a titanium sulphate solution having a low iron to titanium ratio. It is therefore possible to utilise existing equipment more effectively and to achieve a more efficient extraction of iron as useful products such as in the form of copperas ($FeSO_4.7H_2O$). At the same time less co-product in the form of iron compounds is produced. The process is therefore more economical and more environmentally acceptable than conventional processes.

The following example is illustrative of the invention.

EXAMPLE 1

A natural ilmenite which contains 56 weight percent titanium calculated as $TiO_2$, 23 weight percent ferric iron calculated as $Fe_2O_3$ and 21 weight percent ferrous iron calculated as FeO is oxidized by heating in air in a rotary furnace at 800° C. for 1 hour. The product contains 97.2% by weight of the iron present in the ferric valency state. The oxidised ore is then treated in a fluidised bed for 1 hour at 800° C. under an atmosphere containing 3.2% CO, 12.9% $CO_2$, 8.3% $H_2$ and 24.0% $H_2O$ by volume, the remaining gas being substantially all nitrogen. The reduced ore is cooled to ambient temperature. After reduction 97.5% of the iron present in the ore is in the ferrous state, the composition being 57.2% $TiO_2$, 1.2% $Fe_2O_3$ and 41.6% FeO by weight.

20 tonne of this reduced ilmenite ore is mixed with sulphuric acid having a concentration of 89% by weight at a ratio of acid to ore, by weight, of 1.4:1 ($H_2SO_4:ore$). The mixture is heated to 120° C. when an exothermic reaction commences and the temperature is allowed to rise to 190° C. After holding the reaction mass at 190° C. for 1 hour, the resultant cake is cooled and dissolved in 32 tonne water and 20 $m^3$ dilute sulphuric acid (containing 265 g $H_2SO_4$ per liter). Dissolution is completed by holding the mixture at 65° C. for 5 hours after which 96% by weight of the titanium values in the ore are in the digestion liquor. It is difficult to avoid oxidation of some of the ferrous iron during digestion and the digestion liquor has a composition calculated as:

| | |
|---|---|
| $TiOSO_4$ | 22.0 tonne |
| $Fe_2(SO_4)_3$ | 2.0 tonne |
| $FeSO_4$ | 16.5 tonne |

-continued

| | |
|---|---|
| $H_2SO_4$ | 7.7 tonne |
| $H_2O$ | 54.8 tonne |

To this digestion liquor is added 0.28 tonne metallic iron which reduces substantially all the ferric sulphate to ferrous sulphate and also reduces 2% of the Ti present to the trivalent oxidation state.

The liquor is heated to 90° C. with steam and 2 m³ of a suspension of $TiO_2$ nuclei containing 45 g $TiO_2$ per liter is added and the resultant mixture is boiled at 105° C. for 3 hours to precipitate hydrous titanium oxide. The hydrous titanium oxide is separated by filtration, washed and calcined using conventional conditions.

EXAMPLE 2

A natural ilmenite similar to that used in Example 1 is reduced under the same conditions as given in Example 1.

20 tonne of this reduced ilmenite ore is mixed with sulphuric acid having a concentration of 89% by weight at a ratio, by weight, of 1.4 to 1 ($H_2SO_4$:ore) and reacted and dissolved in a manner similar to that described in Example 1 except that the batch reactor is agitated by injection of nitrogen. The digestion liquor has a composition calculated as:

| | |
|---|---|
| $TiOSO_4$ | 22.0 tonne |
| $Fe_2(SO_4)_3$ | 0.6 tonne |
| $FeSO_4$ | 17.6 tonne |
| $H_2SO_4$ | 8.0 tonne |
| $H_2O$ | 54.7 tonne |

To this digestion liquor is added 0.11 tonne metallic iron which reduces substantially all the ferric sulphate to ferrous sulphate and also reduces 2% of the Ti present to the trivalent oxidation state.

The liquor is heated to 90° C. with steam and 2 m³ of a suspension of $TiO_2$ nuclei containing 45 g $TiO_2$ per liter is added and the resultant mixture is boiled at 105° C. for 3 hours to precipitate hydrous titanium oxide. The hydrous titanium oxide is separated by filtration, washed and calcined using conventional conditions.

We claim:

1. A process for the production of titanium oxide consisting essentially of:
    reducing an ilmenite ore containing titanium dioxide and iron oxides to the extent that at least 92 percent by weight of the iron oxides present in the reduced ore is in the ferrous state,
    digesting the reduced ore with sulphuric acid having a concentration of 80–94% $H_2SO_4$ by weight to form a solution of titanium sulphate and iron sulfates,
    adding a reducing agent to the solution in an amount equivalent to less than 4.0 percent metallic iron by weight calculated with respect to said ilmenite ore, and
    precipitating hydrous titanium oxide from the solution.

2. A process according to claim 1 in which at least 95 percent by weight of the iron present in the ilmenite ore is in the ferrous state.

3. A process according to claim 1 in which the reducing agent is scrap iron which is added in an amount which is less than 2.0 percent metallic iron by weight calculated with respect to ilmenite ore.

4. A process according to claim 1 in which the reducing agent is selected from the group consisting of zinc, aluminium, sulphurous acid and sodium thiosulphate.

5. A process according to claim 1 in which addition of the reducing agent causes up to 4 percent by weight of the titanium present to be reduced to trivalent titanium.

6. A process according to claim 1 in which naturally occurring ilmenite ore is reduced in an apparatus selected from the group consisting of fluid bed reactors, rotary kilns and multi-hearth furnaces.

7. A process according to claim 6 in which the ilmenite ore is reduced by an atmosphere produced by partial combustion of natural gas.

8. A process according to claim 6 in which a source of carbon is added to the ore and said source of carbon provides a heat source and a reducing atmosphere when the ore is heated.

9. A process according to claim 6 in which the ilmenite ore is reduced at a temperature in the range 700° C. to 900° C.

10. A process according to claim 1 in which a natural ilmenite ore is oxidised to convert substantially all the iron present to the ferric state and subsequently reduced before digesting with sulphuric acid.

11. A process according to claim 10 in which a natural ore is oxidised by heating in the presence of oxygen to a temperature in the range 600° C. to 1000° C.

12. A process according to claim 6 in which the ilmenite ore is milled after reduction and before digestion with sulphuric acid.

13. A process according to claim 1 in which the ilmenite ore is digested by heating with sulphuric acid to a temperature in the range 95° C. to 120° C.

14. A process according to claim 1 in which the ilmenite ore is digested with sulphuric acid at an acid to ore ratio between 1.4:1 and 2.0:1 by weight.

15. A process according to claim 1 in which titanium oxide formation is induced by the addition of water and the ratio of iron to titanium in the titanium sulphate is adjusted to less than 0.3:1 Fe:$TiO_2$ by weight.

16. A process according to claim 1 in which the titanium sulphate is cooled to a temperature in the range 5° C. to 35° C. to induce crystallisation of ferrous sulphate.

17. A process according to claim 1 in which the titanium sulphate has an acid to titanium ratio, expressed as $H_2SO_4$:$TiO_2$ in the range 1.7:1 to 2.5:1 by weight before precipitation of the hydrous titanium oxide.

18. A process according to claim 1 in which the titanium sulphate is heated to a temperature in the range 80° C. to 100° C. and water is added to induce precipitation of hydrous titanium dioxide.

19. A process according to claim 1 in which the titanium sulphate is heated to a temperature in the range 80° C. to 110° C. and a previously prepared slurry of titanium oxide nuclei is added to induce precipitation of hydrous titanium oxide.

* * * * *